US009494221B2

United States Patent
Lindemann et al.

(10) Patent No.: US 9,494,221 B2
(45) Date of Patent: *Nov. 15, 2016

(54) TORQUE CONVERTER CLUTCH WITH LOW BACK PRESSURE

(71) Applicant: Schaeffler Technologies AG & Co. KG, Herzogenaurach (DE)

(72) Inventors: Patrick Lindemann, Wooster, OH (US); David Avins, Burbank, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/055,753

(22) Filed: Feb. 29, 2016

(65) Prior Publication Data

US 2016/0178042 A1    Jun. 23, 2016

Related U.S. Application Data

(63) Continuation of application No. 13/595,565, filed on Aug. 27, 2012, now Pat. No. 9,309,956.

(60) Provisional application No. 61/531,000, filed on Sep. 4, 2011.

(51) Int. Cl.
  *F16D 37/00* (2006.01)
  *F16H 45/02* (2006.01)
  *F16D 25/0638* (2006.01)

(52) U.S. Cl.
  CPC ......... *F16H 45/02* (2013.01); *F16D 25/0638* (2013.01); *F16H 2045/021* (2013.01); *F16H 2045/0221* (2013.01); *F16H 2045/0284* (2013.01); *F16H 2045/0294* (2013.01)

(58) Field of Classification Search
  CPC .. F16H 45/02; F16H 2045/021; F16D 39/00; F16D 33/00; F16D 47/06
  See application file for complete search history.

(56) References Cited

U.S. PATENT DOCUMENTS

| | | | |
|---|---|---|---|
| 5,547,051 A | 8/1996 | Bartscht et al. | |
| 8,167,103 B2 | 5/2012 | Uhler et al. | |
| 8,348,037 B2 * | 1/2013 | Carrier | F16H 45/02 192/3.3 |
| 2002/0125093 A1 | 9/2002 | Maienschein et al. | |
| 2004/0026201 A1 | 2/2004 | Imasaka et al. | |
| 2005/0133328 A1 * | 6/2005 | Masuya | B60K 6/387 192/3.3 |
| 2007/0295572 A1 | 12/2007 | Samie et al. | |
| 2008/0149442 A1 | 6/2008 | Sturgin | |
| 2009/0157272 A1 | 6/2009 | Uhler et al. | |
| 2011/0120829 A1 * | 5/2011 | Vanni | F16H 45/02 192/3.29 |
| 2012/0152678 A1 * | 6/2012 | Samie | F16H 45/02 192/3.3 |
| 2013/0056319 A1 | 3/2013 | Lindemann et al. | |
| 2014/0076680 A1 * | 3/2014 | Matsuoka | F16H 45/02 192/3.29 |
| 2014/0262666 A1 | 9/2014 | Ushio et al. | |
| 2015/0337935 A1 | 11/2015 | Matsuoka | |

* cited by examiner

Primary Examiner — David J Hlavka
(74) Attorney, Agent, or Firm — Kevin L. Parks

(57) ABSTRACT

A torque converter includes an impeller shell and a backing plate defining at least a portion of a first hydraulic chamber, a cover and a piston plate defining at least a portion of a second hydraulic chamber, and a third hydraulic chamber. The third chamber is sealed from the first and second hydraulic chambers such that a hydraulic flow between the third chamber and the other chambers is at least restricted. In some example embodiments, the torque converter includes a turbine, a stator, and an impeller disposed within the first hydraulic chamber, and a lockup clutch including a piston plate. The first chamber is for being pressurized to prevent cavitation in the turbine, stator, or impeller, the second or third chamber is for being pressurized to engage the lockup clutch, and the other of the second or third chamber is for being de-pressurized to reduce a back pressure on the lockup clutch piston plate.

15 Claims, 4 Drawing Sheets

TORQUE CONVERTER CLUTCH WITH LOW BACK PRESSURE

CROSS-REFERENCE TO RELATED APPLICATIONS

This application is a continuation of application Ser. No. 13/595,565, filed on Aug. 27, 2012, which claims the benefit of U.S. Provisional Application No. 61/531,000 filed on Sep. 4, 2011, which applications are incorporated herein by reference.

FIELD

The invention relates generally to a torque converter clutch, and more specifically to a torque converter clutch with low back pressure.

BACKGROUND

Torque converter clutches are known to increase efficiency of a torque converter under certain driving conditions. In a typical configuration, the clutch is hydraulically applied to bypass a fluid circuit of the torque converter. While maximum efficiency of an typical torque converter fluid circuit is about 92%, the efficiency of a typical torque converter clutch can approach 100%. Therefore, the torque converter clutch can be applied to increase the fuel economy of a vehicle drivetrain.

The transmission must maintain a minimum hydraulic pressure in the torque converter fluid circuit to prevent cavitation. Typical torque converters are configured such that the fluid circuit pressure also acts as a back pressure on the torque converter clutch, opposing the clutch apply pressure. Therefore, the transmission pump must work harder to increase the clutch apply pressure to overcome the back pressure. This work may negate some of the fuel economy benefit gained by engaging the torque converter clutch.

BRIEF SUMMARY

Example aspects broadly comprise a torque converter including an impeller shell and a backing plate defining at least a portion of a first hydraulic chamber, a cover and a piston plate defining at least a portion of a second hydraulic chamber, and a third hydraulic chamber. The third chamber is sealed from the first and second hydraulic chambers such that a hydraulic flow between the third chamber and the other chambers is at least restricted. In some example embodiments, the torque converter includes a turbine, a stator, and an impeller disposed within the first hydraulic chamber, and a lockup clutch including the piston plate. The first chamber is for being pressurized to prevent cavitation in the turbine, stator, or impeller, the second or third chamber is for being pressurized to engage the lockup clutch, and the other of the second or third chamber is for being de-pressurized to reduce a back pressure on the lockup clutch piston plate.

In some example embodiments, the second chamber is for being pressurized to engage the lockup clutch and the third chamber is for being de-pressurized to reduce the back pressure on the piston plate. In an example embodiment, the piston plate has an orifice and a clutch cooling flow from the second chamber to the third chamber is limited by the orifice.

In some example embodiments, the third chamber is for being pressurized to engage the lockup clutch and the second chamber is for being de-pressurized to reduce the back pressure on the piston plate. In an example embodiment, the piston plate has an orifice and a clutch cooling flow within the first chamber is limited by the orifice.

In some example embodiments, the torque converter includes a thrust plate fixed to the cover and a spring retainer. The spring retainer includes the backing plate and the backing plate is sealed to the cover through the thrust plate. In an example embodiment, the backing plate is arranged for sealing to a transmission input shaft. In an example embodiment, the torque converter includes a turbine shell. The backing plate is sealed to the turbine shall and includes an orifice restricting flow between the first and third hydraulic chambers.

Other example aspects broadly comprise a transmission including a first hydraulic path disposed radially between a torque converter impeller hub and a stator shaft, a second hydraulic path disposed within a bore of the input shaft, and a torque converter. The torque converter has a first pressurized chamber hydraulically connected to the first hydraulic path, a second pressurized chamber hydraulically connected to the second hydraulic path, and a third, de-pressurized chamber. In some example embodiments, the transmission has a third hydraulic path connected to the third chamber.

In an example embodiment, the torque converter has an orifice connecting the first and third chambers, and the third hydraulic path is radially disposed between the stator shaft and the input shaft. In some example embodiments, the transmission includes a sleeve disposed within the input shaft bore and the third hydraulic path is disposed radially between the input shaft and the sleeve. In an example embodiment, the transmission has a fourth hydraulic path radially disposed between the stator shaft and the input shaft and the first pressurized chamber is connected to the fourth hydraulic path.

Other example aspects broadly comprise a torque converter with a housing including an impeller shell and a cover, a torque converter clutch, a backing plate, and a drive tab. The torque converter clutch has a piston plate rotationally fixed to the cover, a clutch plate, and a thrust plate fixed to the cover. The drive tab is fixed to the backing plate and rotationally fixed to the clutch plate. The thrust plate is sealed to the piston plate and the drive tab. The piston plate and the backing plate are arranged for sealing to a transmission input shaft. In some example embodiments, the torque converter has a turbine and a damper drivingly engaged with the turbine. The damper includes a spring retainer with the backing plate. In an example embodiment, the torque converter has a first thrust element axially disposed between the spring retainer and the thrust plate a second thrust element axially disposed between the spring retainer and the turbine.

Other example aspects broadly comprise a torque converter with a housing including an impeller shell and a cover, a torque converter clutch, a cover hub fixed to the cover, and a backing plate axially fixed to the cover hub. The torque converter clutch has a piston plate rotationally fixed to the cover and a clutch plate. The piston plate is sealed to the backing plate, the cover, and the cover hub. The cover hub is arranged for sealing to a transmission input shaft at two locations, the sealing locations forming a first hydraulic chamber therebetween. In an example embodiment, the cover hub includes a first flow passage extending to a second hydraulic chamber disposed between the cover and the piston plate and a second flow passage extending from the first hydraulic chamber to a third hydraulic chamber disposed between the piston plate and the backing plate. In an example embodiment, the torque converter has a damper and the clutch plate is drivingly engaged with the damper.

BRIEF DESCRIPTION OF THE DRAWINGS

The nature and mode of operation of the present invention will now be more fully described in the following detailed description taken with the accompanying drawing figures, in which.

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Figure 1A:
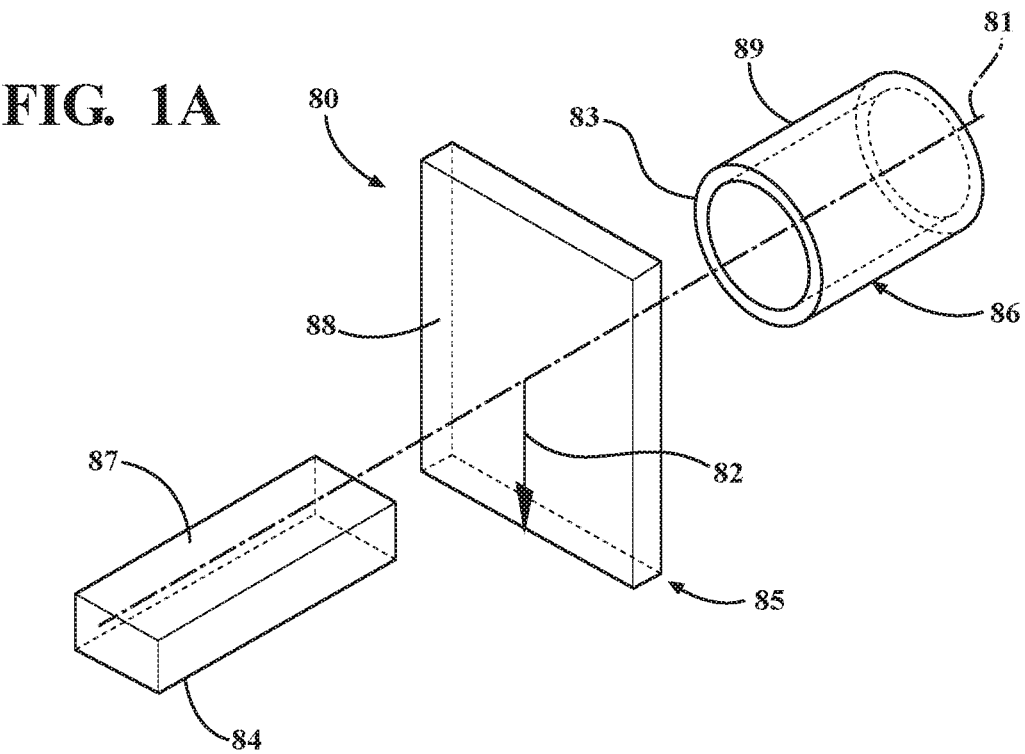
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
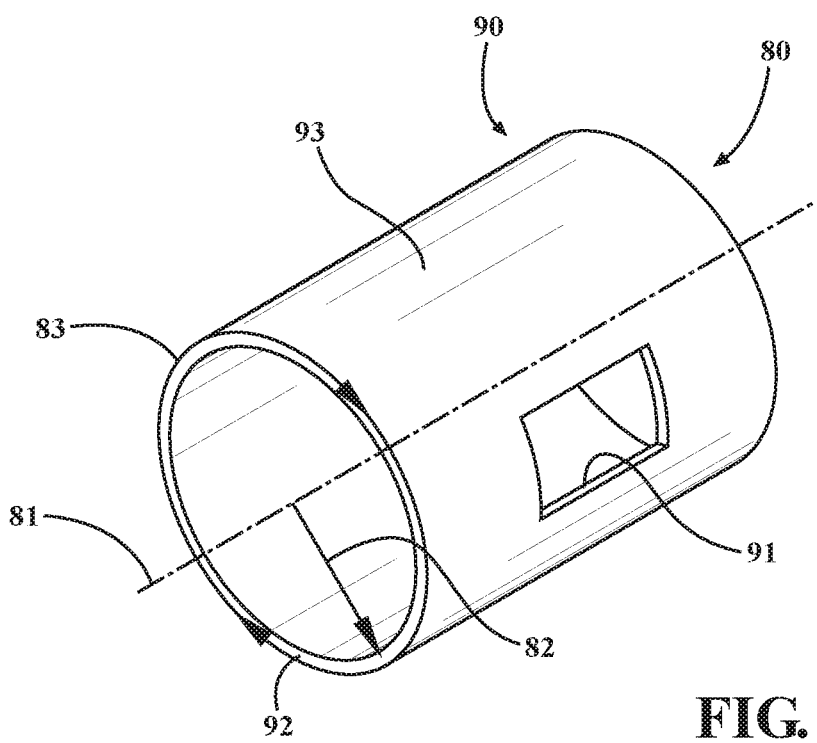
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

Figure 2:
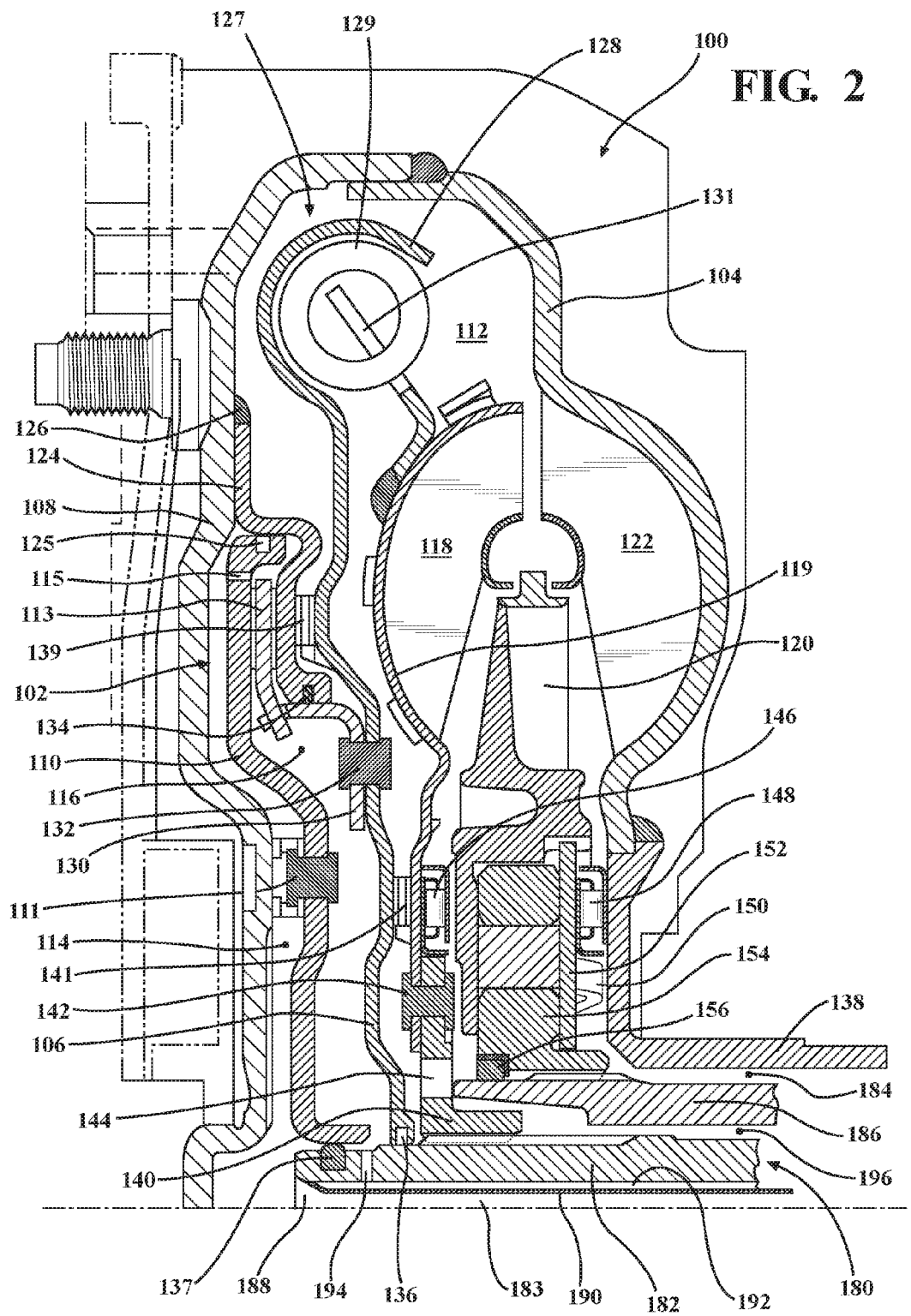
FIG. 2 is a top half section view of a four-pass torque converter having a torque converter clutch with reduced back pressure according to an example aspect.

The following description is made with reference to FIG. 2. FIG. 2 is a top half section view of four-pass torque converter 100 having torque converter clutch, or lockup clutch, 102 with reduced back pressure according to an example aspect. Torque converter 100 includes impeller shell 104, backing plate 106, and cover 108. Shell 104 and cover 108 form a housing for converter 100. Clutch 102 includes piston plate 110 rotationally fixed to cover 108 by leaf spring 111, and clutch plate 113.

Piston plate 110 includes orifice 115. During operation of converter 100, clutch cooling fluid flowing from chamber 114 to chamber 116 is limited by orifice 115. That is, orifice 115 is of sufficiently small diameter such that a pressure of oil in chamber 114 is higher than a pressure of oil in chamber 116 because an exit of chamber 116 is larger than the orifice.

Hydraulic chamber 112 is partially defined by impeller shell 104 and backing plate 106. By partially defined by, we mean that at least a portion of the walls that divide chamber 112 from the other portions of converter 100 are made up of at least portions of shell 104 and plate 106. In other words, housing 104 and plate 106 prevent fluid exchange between chamber 112 and other chambers in converter 100.

Hydraulic chamber 114 is partially defined by cover 108 and piston plate 110. Hydraulic chamber 116 is sealed from chambers 112 and 114 such that a hydraulic flow between chamber 116 and chambers 112 and 114 is at least restricted, as described below. In an example embodiment, torque converter 100 includes turbine 118 (with shell 119), stator 120, and impeller 122 disposed within chamber 112. In the embodiments shown in FIGS. 2 and 3, chamber 112 is for being pressurized to prevent cavitation in turbine 118, stator 120, or impeller 122, chamber 114 is for being pressurized to engage lockup clutch 102, and chamber 116 is for being de-pressurized to reduce a back pressure on piston plate 110 of lockup clutch 102. That is, pressure in chamber 116 is less than pressure in chambers 112 and 114, reducing the pressure acting on piston plate 110 required to engage clutch 102. Chamber 116 may be hydraulically connected to a non-pressurized sump of transmission 180, for example.

Torque converter 100 includes thrust plate 124 fixed to cover 108 at weld 126, for example, and sealed to piston plate 110 at seal 125. Converter 100 also includes damper 127 with spring retainer 128. Damper 127 is drivingly engaged with turbine shell 119 through damper spring 129 and turbine tab 131. In an example embodiment, backing plate 106 is integral with retainer 128. That is, retainer 128 includes backing plate 106. Plate 106 is sealed to cover 108 through thrust plate 124. Converter 100 also includes drive tab 130, fixed to backing plate 106 by rivet 132 and rotationally fixed to clutch plate 113. In the embodiment shown in FIG. 2, the sealing path between plate 106 and cover 108 includes drive tab 130, seal 134 operating between tab 130 and thrust plate 124, and weld 126 fixing plate 124 to cover 108. Otherwise stated, thrust plate 124 is sealed to piston plate 110 and drive tab 130.

In an example embodiment, backing plate 106 is arranged for sealing to input shaft 182 of transmission 180 at seal 136, for example. Similarly, piston plate 110 is arranged for sealing to the input shaft at seal 137, for example. Converter 100 also includes thrust element 139 axially disposed between spring retainer 128 and thrust plate 124, and thrust element 141 axially disposed between spring retainer 128 and turbine shell 119. Thrust elements 139 and 141 may be axial bearings or bushings, for example.

Converter 100 may be assembled with transmission 180. For simplicity, only a portion of transmission 180 is shown in FIG. 2. Transmission 180 includes hydraulic path 184 disposed radially between torque converter impeller hub 138 and stator shaft 186; hydraulic path 188 disposed within bore 183 of input shaft 182. Chamber 112 is hydraulically connected to path 184 and chamber 114 is hydraulically connected to path 188. Transmission 180 includes sleeve 190 disposed within input shaft bore 183. Transmission 180 includes hydraulic path 192, disposed radially between input shaft 182 and sleeve 192, hydraulically connected to chamber 116 through radial passage 194, for example. Hydraulic path 196, radially disposed between input shaft 182 and stator shaft 186 is hydraulically connected to chamber 112 such that fluid in chamber 112 can be circulated from path 184 to path 196, or vice-versa.

Turbine shell 119 is fixed to turbine hub 140 by rivet 142. Hub 140 is arranged for torque transmission to input shaft 182. That is, hub 140 and shaft 182 include mating splines in driving engagement so that torque received by shell 119 is transmitted to input shaft 182. In an example embodiment, hub 140 includes flow passage 144 for pressure equalization in chamber 112. Stator 120 is axially positioned by bearings 146 and 148, and side plate 150. One way clutch 152 includes inner race 154. Race 154 is drivingly engaged with stator shaft 186 via mating splines, and sealed to shaft 186 at seal 156.

Figure 3:
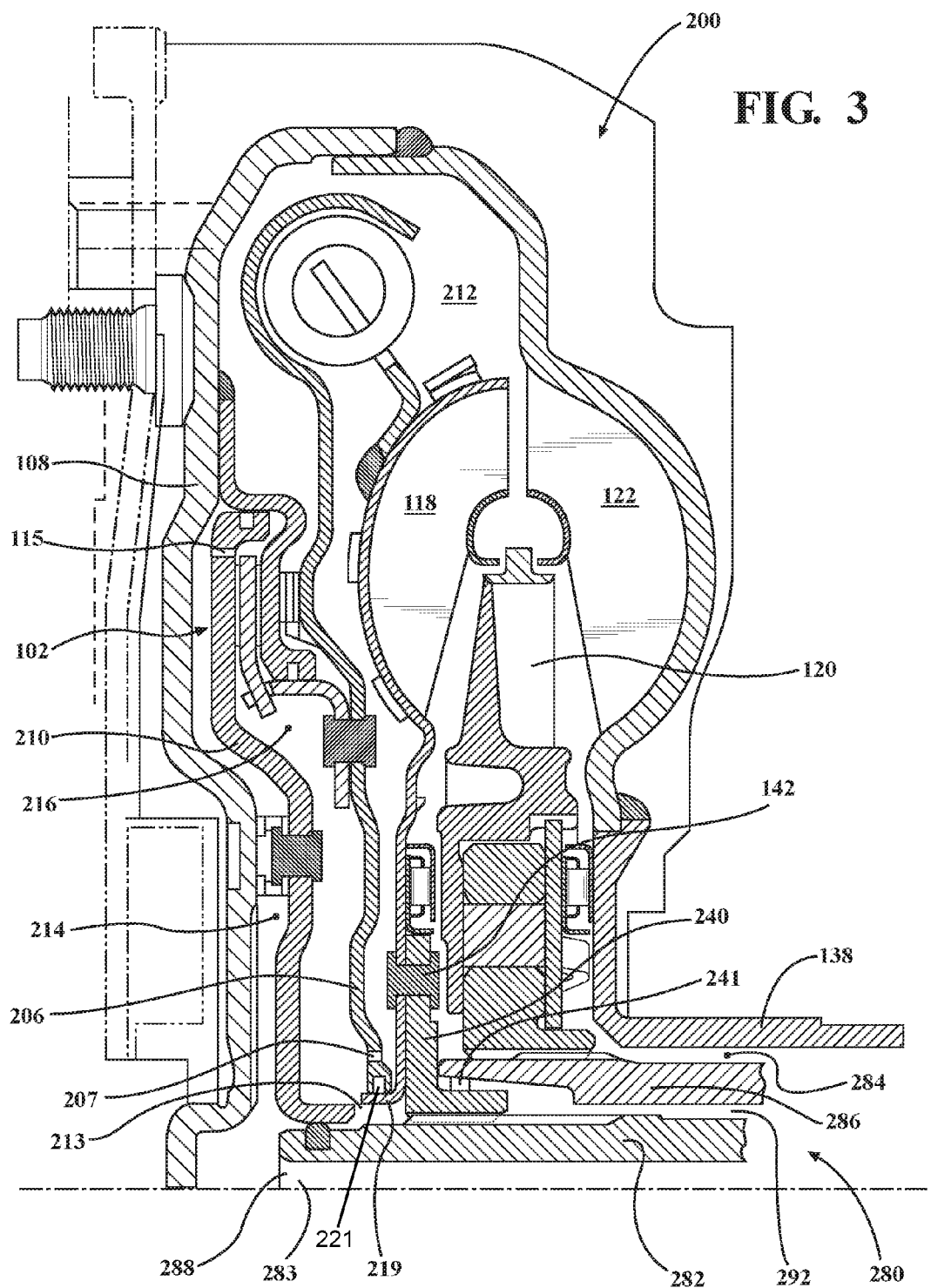
FIG. 3 is a top half section view of a three-pass torque converter having a torque converter clutch with reduced back pressure according to an example aspect.

The following description is made with reference to FIG. 3. FIG. 3 is a top half section view of three-pass torque converter 200 having torque converter clutch 202 with reduced back pressure according to an example aspect. Much of the structure of converter 200 is identical to converter 100 shown in FIG. 2, so only those aspects of converter 200 that differ from converter 100 will be described. Converter 200 includes backing plate 206 and turbine shell 219, similar to backing plate 106 and turbine shell 119 in FIG. 2. In the embodiment shown in FIG. 3, backing plate 206 is sealed to shell 219 at seal 221, for example, and includes orifice 207 restricting flow between chambers 212 and 216.

Converter 200 may be assembled with transmission 280. For simplicity, only a portion of transmission 280 is shown in FIG. 3. Transmission 280 includes hydraulic path 284 disposed radially between torque converter impeller hub 138 and stator shaft 286 and hydraulic path 288 disposed within bore 283 of input shaft 282. Chamber 212 is hydraulically connected to path 284 and chamber 214 is hydraulically connected to path 288. Path 292, hydraulically connected to chamber 216, is radially disposed between stator shaft 286 and input shaft 282.

Turbine shell 219 is fixed to turbine hub 240 by rivet 142. Hub 240 is arranged for torque transmission to input shaft 282. That is, hub 240 and shaft 282 include mating splines in driving engagement so that torque received by shell 219 is transmitted to input shaft 282. In an example embodiment, hub 240 is sealed to stator shaft 286 at seal 241.

Figure 4:
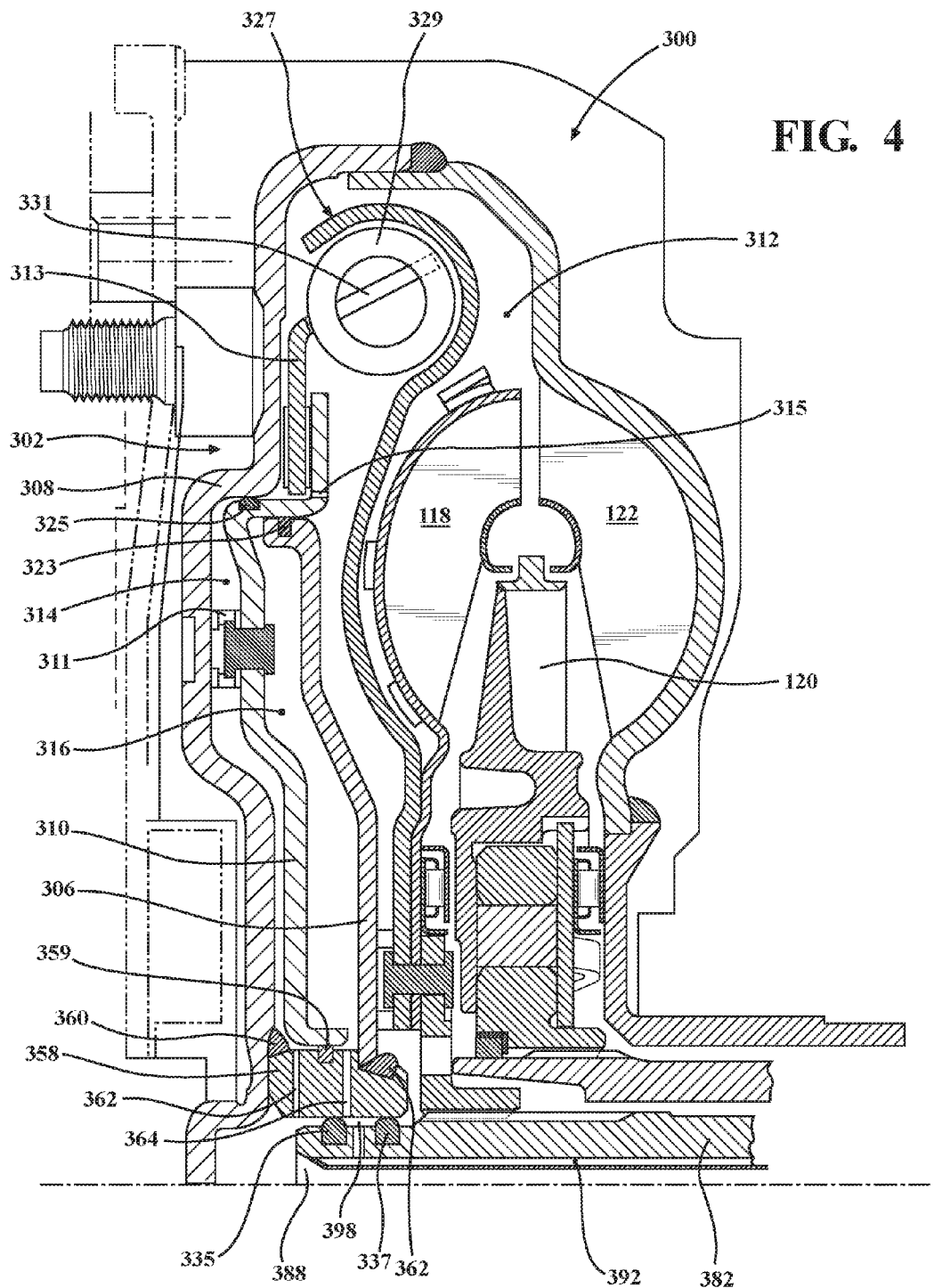
FIG. 4 is a top half section view of a four pass torque converter having a torque converter clutch with reduced back pressure according to an example aspect.

The following description is made with reference to FIG. 4. FIG. 4 is a top half section view of four pass torque converter 300 having torque converter clutch 302 with reduced back pressure according to an example aspect. The description of torque converter 100 above is generally applicable to torque converter 300 with the exception that reference numerals 1XX are replaced by reference numerals 3XX. Notable differences between converters 100 and 300 are described in more detail below.

Chamber 316 is for being pressurized to engage lockup clutch 302 and chamber 314 is for being de-pressurized to reduce back pressure on piston plate 310. Piston plate 310 includes orifice 311. During operation of converter 300, clutch cooling flow in chamber 312 circulates through orifice 315 to cool clutch 302. That is, clutch cooling flow within chamber 312 is limited by orifice 315.

Converter 300 includes cover hub 358 fixed to cover 308 at weld 360. Backing plate 306 is axially fixed to hub 358 by weld 362, though other methods of fixing plate 306 to hub 358 (i.e., staking or snap ring) may be employed. Piston plate 310 is sealed to backing plate 306 at seal 323, to cover 308 at seal 325 and to cover hub 358 at seal 359. Hub 358 is sealed to shaft 382 at seals 335 and 337 forming hydraulic chamber 398 therebetween. Hub 358 includes flow passages 362 and 364 for hydraulically connecting chamber 314 to path 388 and chamber 316 to path 392, respectively.

Converter 300 includes damper 327 with damper spring 329. Clutch plate 313 is drivingly engaged with spring 329 at tab 331.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What we claim is:

1. A lockup clutch for a torque converter, the lockup clutch being configured to transmit a torque from a cover to a transmission input shaft of the torque converter, the lockup clutch comprising:
    a lockup clutch assembly disposed between the cover and a turbine, the lockup clutch assembly being configured to either allow or block transmission of the torque; and
    a damper configured to transmit the torque from the lockup clutch assembly to the turbine;
    the lockup clutch assembly including:
        a first plate disposed between the cover and the turbine;
        a second plate configured to output the torque to the damper;
        at least one clutch plate configured to transmit the torque between the first plate and the second plate;
        a backing plate, axially immovable with respect to the cover, disposed between the cover and an inner peripheral part of the turbine, and forming a first chamber;
        a piston plate, axially movable with respect to the cover, disposed between the cover and the backing plate; the piston being configured to be moved toward the cover by an oil to be supplied to the first chamber to cause the first plate and the clutch plate to be pressed against each other; and,
        a cover hub fixed to the cover and to an inner peripheral part of the backing plate.

2. The lockup clutch of claim 1, wherein the piston plate is sealed to the backing plate, the cover, and a cover hub.

3. The lockup clutch of claim 1, wherein the cover hub is arranged for sealing to a transmission input shaft at two locations, the sealing locations forming an oil path for supplying oil to the first chamber.

4. The lockup clutch of claim 3, wherein the cover hub further includes an outer circumferential surface allowing the piston plate to axially slide thereon.

5. The lockup clutch of claim 1 wherein the second plate is disposed between the cover and the first plate.

6. The lockup clutch of claim 1, wherein the damper includes a damper spring.

7. The lockup clutch of claim 6, wherein the clutch plate is drivingly engaged with the damper spring at a tab.

8. The lockup clutch of claim 1, wherein the first plate and the piston plate are of singular construction.

9. A torque converter comprising:
the lockup clutch of claim 1;
a housing including an impeller shell and the cover; and,
the turbine.

10. A torque converter comprising:
a housing including an impeller shell and a cover;
a torque converter clutch including a piston plate and a clutch plate;
a cover hub fixed to the cover; and,
a backing plate axially fixed to the cover hub, wherein:
the piston plate is sealed to the backing plate, the cover, and the cover hub; and,
the cover hub is arranged for sealing to a transmission input shaft at two locations, the sealing locations forming a first hydraulic chamber therebetween.

11. The torque converter of claim 10 wherein the piston and the cover are rotatable relative to one another.

12. The torque converter of claim 10 wherein the cover hub includes:
a first flow passage extending to a second hydraulic chamber disposed between the cover and the piston plate; and,
a second flow passage extending from the first hydraulic chamber to a third hydraulic chamber disposed between the piston plate and the backing plate.

13. The torque converter of claim 10 further comprising a damper, wherein the clutch plate is drivingly engaged with the damper.

14. A torque converter comprising:
an impeller shell and a backing plate defining at least a portion of a first hydraulic chamber;
a cover and a piston plate defining at least a portion of a second hydraulic chamber;
the backing plate, sealed to the cover, defining at least a portion of a third hydraulic chamber, sealed from the first and second hydraulic chambers such that a hydraulic flow between the third chamber and the other chambers is at least restricted; and,
a lockup clutch including the piston plate, wherein:
the first chamber is for being pressurized to prevent cavitation;
one of the second or the third chamber is for being de-pressurized to reduce the back pressure on the piston plate; and,
the other of the second or the third chamber is for being pressurized to engage the lockup clutch.

15. The torque converter of claim 14 wherein the piston plate comprises an orifice and a clutch cooling flow within the first chamber is limited by the orifice.

* * * * *